Dec. 20, 1955  J. R. HOLLAND  2,727,370
UNIVERSAL COUPLINGS
Filed Aug. 11, 1953

Inventor:
Joseph Ralph Holland;
By his attorneys,
Baldwin & Wight

United States Patent Office

2,727,370
Patented Dec. 20, 1955

2,727,370
UNIVERSAL COUPLINGS

Joseph Ralph Holland, Lincoln, England, assignor of one-half to Clifford Catesby Rogers, Northwood, England Application August 11, 1953, Serial No. 373,486

Claims priority, application Great Britain April 5, 1950

10 Claims. (Cl. 64—17)

This invention relates to shaft couplings and is a continuation-in-part of my application No. 218,777 filed April 2, 1951, now abandoned.

More particularly it is concerned with a universal coupling in which the two shafts to be coupled to one another are formed with forked ends supporting trunnion type mountings interconnected by a cruciform member or spider. This type of coupling, sometimes known as a Hooke's type joint, is frequently incorporated in the propeller shaft of motor vehicles and is also used in shafting to transmit power through two shafts at an angle to one another.

The common practice in this type of universal coupling is to use needle or roller bearings. With the present day high engine speeds, these bearings are subjected to severe strains and although their performance can be considered as satisfactory they have been known to fail. Such joints have to be packed with grease which raises further difficulties, and besides are fairly costly to manufacture.

One of the objects of the present invention is to provide an improved universal joint which eliminates the necessity of a roller or needle bearing.

A further object of the invention is to provide a universal joint capable of manufacture at comparatively low cost and which can easily be assembled.

A still further object is to provide a type of universal joint which is silent in operation, does not require lubrication after assembly, and once assembled is dustproof.

In the universal joint of this invention the spider member is resiliently connected to each of the forked ends of the shafts to be coupled to one another by resilient bushes located in housings carried by the forked ends, anti-friction means being provided between the ends of the spider arms and the housings.

In carrying out the invention, each joint element comprises a metal cup housing an annular resilient block, two such cups being secured to the forked ends of each shaft to receive the opposite arms of the spider connecting member, which is aligned endwise within the resilient block by an anti-friction ball.

The position of each ball is located by a recess and groove. Preferably the base of the metal cup, which may be a press fit in a housing in the limb of the fork, is formed with a recess for the ball, a slot being cut in the associated end of the centre piece to permit of relative movement of the latter.

In practice the slot is of arcuate section and is struck to a radius whose centre is coincident with the centre of the centre piece.

According to a further feature of the present invention, in place of providing a ball element located in a recess in the metal cup forming the housing, I make use of a pin or stud on the housing, the end of which engages the guide slot in the spider arm.

The invention is illustrated in the accompanying drawings in which Figure 1 is a longitudinal section of a propeller shaft for a motor vehicle fitted with a universal coupling constructed in accordance with the invention.

Figure 1:
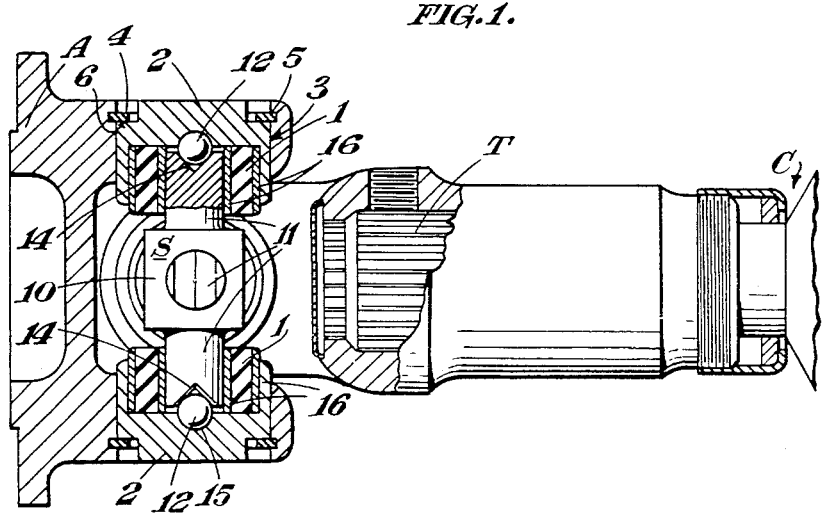

In the drawings, A indicates one section of the propeller shaft, which is coupled through a universal coupling to the other section C usually referred to as the Cardan shaft sections. The shafts A and C also constitute coupling sections, and are each formed with forked end members, which are inter-connected to one another by a spider or cruciform member indicated generally at S. Section C of the propeller shaft incorporates the usual telescopic splined coupling T.

The universal joint coupling according to this invention between the forked ends of the shafts A and C is by means of flexible connections including annular blocks 1 of rubber or other resilient material, hereinafter referred to as resilient bushes, which are fitted on to the four arms of the spider S and are enclosed in metal housings 2 carried by the forked ends of the respective shafts A and C to be coupled to one another.

Figure 2:
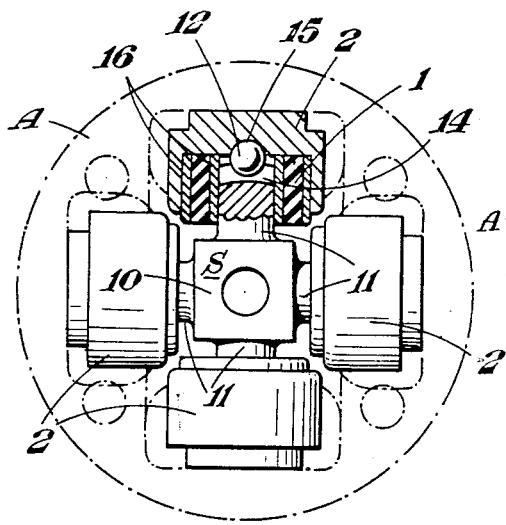
Figure 2 is a transverse view showing the central spider or cruciform member, one of the joints being shown in section.

In the embodiment of the invention illustrated in Figures 1 and 2, the metal housing 2 takes the form of a shallow cup, which is a friction fit in transverse drillings 3 in each pair of forks on the shaft ends. The metal cup is held in position by means of a circlip 4 inserted into a groove 5 in the hole 3, the circlip engaging an annular shoulder 6 cut in the outer end of the metal cup 2.

The spider S may be constructed from a rectangular block 10 having on four opposite sides projecting spider arm members 11 on which the resilient bushes 1 are mounted, the bushes 1 by reason of their flexibility permit relative angular displacement of the shafts A and C as the propeller shaft is rotated to transmit the drive.

Driving connection between the outer ends of the spider arms 11 and the interior end surfaces of the metal cups 2 is by means of locating parts, as shown anti-friction elements, which may consist of steel balls 12.

For this purpose, as can be seen from Figure 2, the spider arms 11 are formed at their ends with circumferential depressions or ball guide slots 14 of V-section, the slots being cut to a centre coincident with the centre of the centre block 10. A spherical depression or recess 15 is cut in the end face of each metal cup.

The bushes 1 are bonded to metal in relatively fixed relation to the associated fork end members 2 and arm members 11. In order to facilitate the assembly of the joint, the rubber bushes are preferably bonded to inner and outer metal sleeves 16, the inner and outer diameters of which are a friction fit respectively with the spider arms 11 and the interior walls of the metal cups 2. In practice, the joint is assembled by fixing the spider piece 10 to one of the propeller shaft sections A or C and it is then connected to the other section A or C as the case may be, by first entering the other two arms of the spider and then finally inserting the metal cups 2, in which the rubber bushes have previously been mounted, from the outside of the forks.

The depths of the spherical recess in the base of the cup and of the arcuate slot are preferably each less than the radial dimension of the ball; conveniently it is approximately ⅓ diameter so as to reduce friction between the cup and centre piece.

The depression 14 in each of the flexible connections is of such dimensions relative to the associated locating part 12 as to provide substantial clearance between the locating part and the ends of the depression 14 circumferentially with respect to the shaft or coupling sections A and C, thus allowing flexibility of the flexible connection circumferentially with respect to the sections A and C, the dimensions of the depression 14 relative to the dimensions of the locating part 12, however, being such as not to provide substantial clearance between the locating part 12 and the depression 14 in a direction substantially parallel to the axes of the sections A and C.

Lubrication for the ball is added before each unit is assembled and requires no further attention since no dirt or dust can penetrate after assembly.

The use of a rubber or like resilient bush in the joint as a medium to absorb shock and maintain silence has the further advantage that it dispenses with expensive machining and so reduces the cost of the joint as a whole.

In practice the rubber sleeve joint is designed to give a normal torque between 7° and 11°. It has been found in practice however that when using a sleeve of approximately ⅛ inch wall thickness with a cup having an internal diameter of about 9/16 inch that a higher torque angle is possible.

Figure 3:
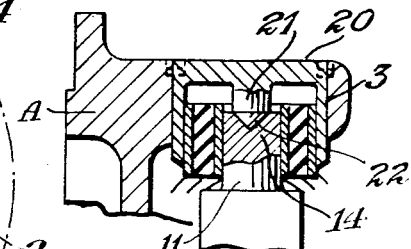
Figure 3 is a sectional view showing a metal cup constructed in accordance with an alternative embodiment of the invention.

Referring now to Figure 3, the opening 3 in each fork on the shaft A is fitted with a metal cup 20 having locating part or element, which, in the form shown, comprises an integral centre pin 21 provided with a tapered end 22 for engagement with the circumferential guide slot 14 in the associated spider arm 11. It will be obvious that the pin or stud may be formed integrally with the metal cup such as by a machining operation or alternatively, a separate stud may be secured by means of a brazing operation in a hole in the bottom wall of a cup.

By employing a pin having a taper at the end to fit the circumferential groove in the end of the spider arm, I obtain linear contact between the locating stud and the groove which will reduce any tendency to wear.

In place of a taper end, I may use a straight-sided pin or one with a rounded end to engage a groove of corresponding section.

In all forms of the invention the relative dimensions of the locating parts and the depressions in the flexible connections are such that opposite wall portions of the depressions positively engage the locating part on either side of a plane passing centrally through the locating part and perpendicularly to the common axis of the shaft sections so as to prevent relative movement between the shaft sections in a direction parallel to the common axis.

I claim:

1. In a shaft coupling, the combination of a driving shaft section and a driven shaft section, each shaft section having forked end members, a spider coupling between the shaft sections and having arm members, and flexible connections respectively between the arm members of the spider coupling and the forked end members of said shaft sections, each of said flexible connections including a resilient bush enclosing a spider arm member, a housing for the bush provided in the associated forked end member, a circumferential guide slot in one of said members, a recess in the other of said members and a ball element located in said recess and in said slot for maintaining said spider coupling against substantial bodily displacement radially with respect to said shaft sections.

2. A shaft coupling as claimed in claim 1 in which, in each of said flexible connections, the guide slot is in the spider arm member and the recess is in the shaft section forked end member.

3. A shaft coupling as claimed in claim 1 in which each flexible connection includes inner and outer metal sleeves bonded to the associated resilient bush.

4. A shaft coupling as claimed in claim 1 in which each flexible connection resilient bush is bonded to metal in relatively fixed relation to the associated forked end member and arm member.

5. In a shaft coupling, the combination of a driving shaft section and a driven shaft section, each shaft section having forked end members, a spider coupling between the shaft sections and having arm members, and flexible connections between the arm members of the spider coupling and the forked end members of said shaft sections, each of said flexible connections including a resilient bush enclosing a spider arm member, a housing for the bush provided in the associated forked end, a depression in each of said members, and a ball element extending into both of said depressions, one of said depressions in each of said members being of such dimensions relative to the associated ball element as to provide substantial clearance between said ball element and the ends of said one of said depressions circumferentially with respect to said shaft sections to thereby allow flexibility of said flexible connection circumferentially with respect to said shaft sections, said one of said depressions having wall portions positively engaging said ball element on opposite sides of a plane extending centrally through said ball element and perpendicularly to the common axis of said shaft sections, whereby to prevent relative movement between the associated two members parallel to the common axis of said shaft section.

6. A shaft coupling as claimed in claim 1 in which each housing comprises a metal cup-shaped element receiving the associated ball element.

7. In a shaft coupling, the combination of a driving shaft section and a driven shaft section, each shaft section having forked end members, a spider coupling between said shaft sections and having arm members, and flexible connections respectively between said arm members of the spider coupling and the forked end members of said shaft sections, each of said flexible connections including a resilient bush enclosing a spider arm member, a housing for the bush provided in the associated forked end member, a circumferential guide slot in one of said members, and a locating part carried by the other of said members and being constrained against substantial movement relative thereto circumferentially and axially with respect to said shaft sections, said locating part extending into said slot for maintaining said spider coupling against substantial bodily displacement radially with respect to said shaft sections while allowing circumferential flexibility of said shaft coupling.

8. A shaft coupling between a driving shaft section and a driven shaft section, each shaft section having forked end members, a spider coupling element between the shafts and having arm members, and flexible connections respectively between the arm members of the spider element and the forked end members of said shafts in which each of said flexible connections includes a resilient bush enclosing a spider arm member, a housing for the bush provided in the associated forked end member, said spider arm member having a circumferential guide slot in which engages a locating element carried by the housing and adapted to maintain the spider element in axial alignment with the said shafts.

9. A shaft coupling as set forth in claim 8 in which the locating element consists of a pin having a tapered end to engage the guide slot.

10. A shaft coupling as set forth in claim 9 in which the housing comprises a metal cup and the locating pin is carried centrally of the cup.

References Cited in the file of this patent

UNITED STATES PATENTS

| 1,943,814 | Cutting | Jan. 16, 1934 |
| 2,107,497 | Padgett | Feb. 8, 1938 |
| 2,217,082 | Swenson | Oct. 8, 1940 |